United States Patent [19]

Tokunaga et al.

[11] Patent Number: 4,678,706
[45] Date of Patent: Jul. 7, 1987

[54] MAGNETIC RECORDING MEDIUM

[75] Inventors: Fumihiro Tokunaga; Takamitsu Asai; Masaaki Fujiyama, all of Kanagawa, Japan

[73] Assignee: Fuji Photo Film Co., Ltd., Kanagawa, Japan

[21] Appl. No.: 791,174

[22] Filed: Oct. 24, 1985

[30] Foreign Application Priority Data

Oct. 24, 1984 [JP] Japan ................. 59-222233

[51] Int. Cl.$^4$ .............................. G11B 5/72
[52] U.S. Cl. ................... 428/323; 427/128; 427/131; 428/328; 428/330; 428/694; 428/695; 428/900; 428/336
[58] Field of Search ............... 428/694, 695, 400, 403, 428/328, 329, 323, 336, 330; 427/128, 131; 252/62.54; 360/134–136

[56] References Cited

U.S. PATENT DOCUMENTS

| 3,630,910 | 12/1971 | Akashi | 252/62.54 |
| 3,833,412 | 9/1974 | Akashi | 252/62.54 |
| 4,117,190 | 9/1978 | Akashi | 428/323 |
| 4,420,408 | 12/1983 | Kajimoto | 428/329 |
| 4,420,532 | 12/1983 | Yamaguchi | 428/329 |
| 4,442,171 | 4/1984 | Sato | 428/694 |
| 4,469,758 | 9/1984 | Scott | 428/900 |
| 4,511,484 | 4/1985 | Aonunuma | 427/128 |
| 4,584,243 | 4/1986 | Kadokura | 427/128 |

FOREIGN PATENT DOCUMENTS

| 0172152 | 9/1984 | Japan | 428/329 |
| 0055515 | 3/1985 | Japan | 428/328 |

Primary Examiner—Ellis P. Robinson
Attorney, Agent, or Firm—Sughrue, Mion, Zinn Macpeak & Seas

[57] ABSTRACT

A magnetic recording medium is described, comprising a non-magnetic support, a magnetic recording layer on one side of the support, and a backing layer on the opposite side of the support to the magnetic recording layer, wherein said backing layer comprising a binder and a powder dispersed in the binder, wherein the powder is a powdered oxide represented by the formula $M^1.M^2.O_{2+x}$ (wherein $M^1$ is at least one element selected from the group consisting of Ba, Sr, Pb and Ca, $M^2$ is at least one element selected from the group consisting of Ti, Zr and Sn, and x is in the range of from 0 to 0.9) or a mixture of said powdered oxide and carbon black. This magnetic recording medium has a decreased coefficient of friction, is free from formation of scratches, has good durability, and furthermore, maintains good S/N characteristics.

17 Claims, No Drawings

MAGNETIC RECORDING MEDIUM

FIELD OF THE INVENTION

The present invention relates to a magnetic recording medium. More particularly, it is concerned with a magnetic recording medium having excellent electromagnetic conversion characteristics, a decreased coefficient of friction, good running durability and low drop out.

BACKGROUND OF THE INVENTION

In general, a plastic film, such as a polyethylene terephthalate (PET) film, is widely used as a non-magnetic support for magnetic recording media. Such plastic films, however, have disadvantages in that they are readily electrostatically charged, thereby for example, causing dropout as a result of adhesion of dust.

In order to decrease the surface electric resistance of a magnetic recording tape, the use of a backing layer containing carbon black has been proposed.

However, the conventional backing layer formed by using only carbon black and a binder has disadvantages in that it is readily scratched and the formation of such scratches causes crumbling of the backing layer, thereby increasing drop out. Moreover, the coefficient of friction thereof is increased during repeated running.

For this reason, an abrasive agent is further added to the backing layer. However, since known abrasive agents, such as chromium oxide ($Cr_2O_3$), alumina, silicon carbide, titanium carbide, silicon nitride, titanium nitride, and diamond are electrically non-conductive, the addition of such abrasive agents increases the surface electric resistance of the backing layer although it improves the running durability. The increase in the surface electric resistance, as described above, will lead to adhesion of dust, thereby, for example, increasing the drop out. If the amount of the added abrasive agent in the backing layer is decreased, the surface electric resistance thereof is decreased, but the durability deteriorates and the drop out is increased.

Accordingly, with conventional carbon black/binder/abrasive agent combinations, it has been very difficult to overcome both the problems of sufficient durability and surface electric resistance of the backing layer.

SUMMARY OF THE INVENTION

An object of the present invention is to provide a magnetic recording medium which is decreased in a coefficient of friction, freed from formation of scratches, and improved in running durability, without deteriorating its S/N characteristics.

Another object of the present invention is to provide a magnetic recording medium which is decreased in drop out due to the formation of scratches or charging.

The above objects are achieved by the present invention which relates to a magnetic recording medium comprising a non-magnetic support, a magnetic recording layer on one side of the support, and a backing layer on the opposite side of the support to the magnetic recording layer, wherein said backing layer comprising a binder and a powder dispersed in the binder, wherein the powder is a powdered oxide represented by the formula $M^1.M^2.O_{2+x}$ (wherein $M^1$ is at least one element selected from the group consisting of Ba, Sr, Pb and Ca, $M^2$ is at least one element selected from the group consisting of Ti, Zr and Sn, and x is in the range of from 0 to 0.9) or a mixture of said powdered oxide and carbon black.

It has been found in the present invention that oxides represented by the formula $M^1.M^2.O_{2+x}$ have electrical conductivity like carbon black and also have an abrasion effect. That is, it has been found that if such oxides are added to a backing layer, a backing layer which is excellent in both a durability and surface electric resistance can be obtained.

DETAILED DESCRIPTION OF THE INVENTION

The oxides of the present invention represented by the formula $M^1.M^2.O_{2+x}$ are electrically conductive. In order to suffice the required electrical conductivity, x of the above formula is in the range of from 0 to 0.9, preferably from 0 to 0.7, and more preferably from 0 to 0.5. Thus, as the oxide, solid solutions (comprising two or more oxides) can be used, such as $(Ba_bPb_{1-b})TiO_{2+x}$ ($0<b<1$) and $Sr(Ti_cZr_{1-c})O_{2+c}$ ($0<c<1$).

Examples of the method for producing $(Ba_bPb_{1-b})TiO_{2+x}$ are disclosed in "Inorganic reactions relating to solid" of "*Kagaku Sosetsu* (General Remarks of Chemistry)", 9, 23–29 (1975), editd by Japan Chemical Society. That is, for example, the oxide can be obtained by reducing a fine powder of $BaTiO_3$ in a stream of $H_2$ at 800° C. for 2 hours. The average particle diameter of the oxide is preferably 0.5 μm or less, and more preferably 0.03 to 0.3 μm. If oxides having different average particle size are used in combination, the electrical conductivity and durability of the backing layer are more increased. For example, if fine particles having an average diameter of 0.03 to 0.09 μm and coarse particles having an average diameter of 0.1 to 0.3 μm are used in combination, the efficiency of filling up is increased thereby the electrical conductivity is increased.

The oxide can also be used in combination with carbon black. In this case, the ratio of the oxide to the carbon black is preferably 1:9 or more by weight, more preferably 3:7 or more by weight, and especially preferably 5:5 or more by weight. The type of the carbon black used in the present invention is not critical and the conventionally known carbon blacks can be used. The particle diameter of the carbon black is preferably 5 to 250 m, and more preferably 10 to 150 mμ. Several types of carbon blacks having different particle sizes can be used in combination.

Binders which are conventionally known in the art can be used in the backing layer of the present invention. For example, thermoplastic resins, thermosetting resins, reactive type resins, and the mixtures thereof can be used. Typical examples are shown hereinafter. The glass transition temperature of the binder, which is one kind of the resin or the mixture of two or more resins, is preferably 40° C. or more and more preferably 60° C. or more.

Typical examples of the thermoplastic resin include a vinyl chloride-vinyl acetate copolymer, a vinyl chloride-vinylidene chloride copolymer, a vinyl chloride-acrylonitrile copolymer, an acrylic ester-acrylonitrile copolymer, an acrylic ester-vinylidene chloride copolymer, an acrylic ester-styrene copolymer, a methacrylic ester-acrylonitrile copolymer, a methacrylic ester-vinylidene chloride copolymer, a methacrylic ester-styrene copolymer, a urethane elastomer, polyvinyl fluoride, a vinylidene chloride-acrylonitrile copolymer, a butadiene-acrylonitrile copolymer, a polyamide resin, polyvinyl butyral, cellulose-based resins (e.g., cellulose acetate butyrate, cellulose diacetate, cellulose propionate, and nitro cellulose), a styrene-butadiene copolymer, a polyester resin, a chloro vinyl ether-acrylic ester copolymer, an amino resin, and various rubberous resins.

Typical examples of the thermosetting resin or reactive resin include a phenol resin, an epoxy resin, a polyurethane hardeninhg-type resin, a urea resin, a melamine resin, an alkyd resin, an acrylic type reactive resin, polyisocyanate, and polyamine.

The ratio of the oxide or the mixture of the oxide and the carbon black to binder (oxide or (oxide+carbon black):binder) is preferably 0.2:1 to 3:1 by weight, more preferably 0.3:1 to 2:1 by weight, and especially preferably 0.5:1 to 1.5:1 by weight. If the above ratio is larger than upper limit, i.e., the amount of the oxide or oxide/carbon black mixture being used is too large, powder-dropping readily occurs. On the other hand, if the ratio is smaller than the lower limit, i.e., the amount of the oxide or oxide/carbon black mixture being used is too small, the surface electric resistance is increased and also the coefficient of friction is increased.

The backing layer of the present invention has a thickness of from 0.2 to 2.0 μm, preferably from 0.3 to 1.5 μm.

Lubricating agents commonly used in magnetic tapes can also be added to the backing layer of the present invention by techniques such as kneading and overcoating in amount of from 0.3 to 30 parts by weight, preferably from 0.5 to 10 parts by weight per 100 parts by weight of the powders in the backing layer. Examples of the lubricating agents and applications thereof for magnetic recording media are disclosed in U.S. Pat. No. 4,135,016.

Examples of methods for coating the backing layer of the present invention of a support are disclosed in U.S. Pat. No. 4,135,016.

The magnetic layer used in the present invention includes a coating-type and a deposition-type magnetic layers.

The coating-type magnetic layer used in the present invention has a thickness of from 1.0 to 10.0 μm, preferably from 1.0 to 7.0 μm.

Magnetic powders which can be used in the coating-type magnetic layer of the present invention include a hexagonal system ferrite magnetic powder having a plate diameter of 0.35 μm or less, the commonly used γ-Fe$_2$O$_3$ and CrO$_2$, Co-containing magnetic iron oxide having a specific surface area (S$_{BET}$) of at least 28 m$^2$/g, and ferromagnetic metal powders having a specific surface area (S$_{BET}$) of at least 20 m$^2$/g.

Examples of the hexagonal system ferrite magnetic powder include substitutes of barium ferrite, strontium ferrite, lead ferrite, calcium ferrite, manganese bismuch, and a hexagonal system cobalt alloy. Particularly preferred examples are Co-substituted barium ferrite and Co-substituted strontium ferrite. The plate diameter of the hexagonal system ferrite magnetic powder is preferably 0.01 to 0.3 μm and more preferably 0.03 to 0.2 μm, and its plate thickness is preferably 0.3 μm or less and more preferably 0.003 to 0.1 μm. The ratio of the plate diameter to the plate thickness (plate diameter/plate thickness ratio) is usually 1:1 or more and preferably 2:1 to 10:1.

Examples of the ferromagnetic metal powder used in the present invention include ferromagnetic metal powders having a metal component in amount of 75 wt% or more based on the total amount of the ferromagnetic metal powder, wherein the metal component contains at least one kind of ferromagnetic metal or alloy, such as Fe, Co, Ni, Fe-Co, Fe-Ni, Co-Ni or Co-Ni-Fe, in an amount of at least 80 wt% based on the total amount of the metal component, and said ferromagnetic metal powders can further contain a component consisting of, for example, Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B and P, in an amount of 20 wt% or less based on the total amount of the metal component. Furthermore, said ferromagnetic metal powders can contain a small quantity of water, a hydroxide or oxide.

With regard to the binder, additives and so forth as used in the coating-type magnetic layer of the present invention, conventionally used binders, lubricating agents, abrasive agents and so forth can be used. In more detail, the magnetic layer of the present invention can be formed using materials and methods for prepartion thereof as described in Japanese Patent Publication No. 26890/81.

Examples of the deposition-type magnetic layer used in the present invention and the method for preparation thereof are disclosed in U.S. Pat. No. 4,097,650.

The non-magnetic support used in the present invention incluseds a polyethylene terephthalate film, and has a thickness of from 5.0 to 30.0 μm, preferably from 5.0 to 20.0 μm.

The present invention is described in greater detail with reference to the following non-limiting examples. In the following examples, all parts are by weight.

EXAMPLE 1

A magnetic layer containing Co-substituted Ba ferrite was coated in a dry thickness of 4 μm on one side of a 13 μm thick polyethylene terephthalate film, and a backing layer was coated in a dry thickness of 0.8 μm on the opposite side of the film.

The compositions of the magnetic layer and the backing layer are shown below.

| | Amount (parts) |
|---|---|
| Magnetic Layer | |
| Co-substituted Ba ferrite (average plate diameter: 0.08 μm; average plate thickness: 0.02 μm) | 100 |
| Maleic anhydride-containing vinyl chloride-vinyl acetate copolymer resin (Vinyl chloride:vinyl acetate: maleic anhydride = 86:13:1 by weight, average molecular weight: 28,000) | 7 |
| Polyurethane resin (Polycondensation product of butylene glycol diadipate and tolylenediisocyanate, average molecular weight: 20,000) | 5 |
| Polyisocyanate (Reaction product of toluidine diisocyanate and trimethylolepropane, molecular weight: 656) | 6 |
| Stearic acid | 0.5 |
| Oleic acid | 0.8 |
| Amyl stearate | 0.9 |
| Carbon black (average particle diameter: 40 mμ) | 4 |
| Al$_2$O$_3$ powder (Average particle diameter: 0.32 μm) | 2 |
| Butyl acetate | 150 |
| Backing Layer | |
| Nitro cellulose (Average molecular weight: 27,000, nitration degree: 12.0%) | 25 |
| Polyurethane resin | 10 |

| | Amount (parts) |
|---|---|
| (Polycondensation product of butylene glycol diadipate and tolylenediisocyanate, average molecular weight: 20,000) | |
| Polyisocyanate | 15 |
| (Reaction product of toluidine diisocyanate and trimethylolepropane, molecular weight: 656) | |
| Stearic acid | 0.5 |
| Barium titanate (BaTiO$_2$) | Shown in Table 1 |
| (Average particle diameter: 0.16 μm) | |
| Carbon black | Shown in Table 1 |
| (average particle diameter: 40 mμ) | |
| Methyl ethyl ketone | 800 |

The thus-obtained magnetic tape defined as Sample Nos. 1 to 7 was measured for various properties. The results are shown in Table 1.

TABLE 1

| Sample No. | Barium Titanate (parts) | Carbon Black (Parts) | Ratio of Oxide + Carbon Black/Binder | Initial Coefficient of Friction | Coefficient of Friction after 100 passes | Degree of Formation of Scratches in the Backing Layer after 100 passes | Number of Drop Out (15 μsec) per Minute | Initial Color S/N (dB) | Surface Electric Resistance of Backing Layer (Ω/inch$^2$) |
|---|---|---|---|---|---|---|---|---|---|
| 1* | 0 | 40 | 0.8 | 2.0 | 3.5 | great | 18 | 0 | 1.1 × 10$^7$ |
| 2* | 2 | 38 | 0.8 | 1.9 | 2.8 | great | 13 | 0 | 1.3 × 10$^7$ |
| 3 | 4 | 36 | 0.8 | 1.8 | 2.2 | small | 7 | 0 | 1.7 × 10$^7$ |
| 4 | 12 | 28 | 0.8 | 1.8 | 2.0 | small | 5 | 0 | 2.4 × 10$^7$ |
| 5 | 20 | 20 | 0.8 | 1.7 | 1.8 | extremely small | 2 | 0 | 3.9 × 10$^7$ |
| 6 | 30 | 10 | 0.8 | 1.7 | 1.8 | extremely small | 3 | 0 | 5.0 × 10$^7$ |
| 7 | 40 | 0 | 0.8 | 1.7 | 1.7 | extremely small | 2 | 0 | 5.8 × 10$^7$ |

*Comparative Example

The measurements for the characteristics of the samples are conducted with the following manners.

(1) Coefficient of Friction

The coefficient of kinematic friction between the sample and a stainless steel rod (SUS 420) at a relative speed of 3.3 cm/sec with a load of 50 g was measured. This measurement was applied to the new samples and the samples after 100 passes running on the VHS-type VTR.

(2) Number of Drop Out

The number of drop out was measured after 100 passes running with the drop out counter Model VD-3D produced by Victor Company of Japan Ltd. when the reproduced output level was decreased by 16 dB or more for 5 μsec or more.

(3) Initial Color S/N

The initial color S/N was measured with the noise meter Model 925C produced by Shibasoku Co., Ltd. having a high pass filter of 10 Hz and a low pass filter of 500 Hz in AM mode, and VTR used herein was Model NV-8300 produced by Matsushita Electric Industrial Co., Ltd. Sample No. 1 was determined 0 dB as the standard.

(4) Surface Electric Resistance

The surface electric resistance of the backing layer of the present invention was measured with the digtal surface electric resistance meter Model TR-8611A produced by Takeda Riken Co., Ltd. at a temperature of 23° C. and a relative humidity of 30%, and with a measurement area of a half inch square.

(5) Degree of Formation of Scratches

The degree of formation of scratches was evaluated after 100 passes running with the naked eye.

EXAMPLE 2

A magnetic layer containing ferromagnetic metal powder was coated in a dry thickness of 3.5 μm on one side of a 10 μm thick polyethylene terephthalate film, and a backing layer was coatd in a dry thickness of 1 μm on the other side of the film.

The compositions of the magnetic layer and the backing layer are shown below.

| | Amount (parts) |
|---|---|
| Magnetic Layer | |
| Ferromagnetic metal powder | 100 |
| (Fe—Ni alloy; Ni content: about 5 wt %; specific surface area (S$_{BET}$): 55 m$^2$/g) | |
| Vinyl chloride-vinyl acetate copolymer resin | 11 |
| (Vinyl chloride:vinyl acetate = 87:13 by weight) | |
| Polyurethane resin | 11 |
| (Polycondensation product of butylene glycol diadipate and tolylenediisocyanate, average molecular weight: 20,000) | |
| Polyisocyanate | 8 |
| (Reaction product of toluidine diisocyanate and trimethylolepropane, molecular weight: 656) | |
| Stearic acid | 1 |
| Oleic acid | 1 |
| Butyl stearate | 1 |
| Carbon black | 1.5 |
| (average particle diameter: 40 mμ) | |
| Cr$_2$O$_3$ powder | 1.5 |
| (Average particle diameter: 0.13 μm) | |
| Methyl ethyl ketone | 500 |
| Backing Layer | |
| Nitro cellulose | 25 |
| (Average molecular weight: 27,000, nitration degree: 12.0%) | |
| Polyurethane resin | 10 |
| (Polycondensation product of butylene glycol diadipate and tolylenediisocyanate, average molecular weight: 20,000) | |
| Polyisocyanate | 15 |
| (Reaction product of toluidine diisocyanate and trimethylolepropane, molecular weight: 656) | |
| Strontium titanate (SrTiO$_{2.1}$) | Shown in Table 2 |
| (Average particle diameter: 0.13 μm) | |
| Methyl ethyl ketone | 800 |

The thus-obtained magnetic tape defined as Sample Nos. 8 to 17 was measured for various properties with the same manner as in Example 1. The results are shown in Table 2.

TABLE 2

| Sample No. | Strontium Titanate (parts) | Ratio of Oxide/Binder | Initial Coefficient of Friction | Coefficient of Friction after 100 passes | Degree of Formation of Scratches in the Backing Layer after 100 passes | Number of Drop Out (15 μsec) per Minute | Initial Color S/N (dB) | Surface Electric Resistance of Backing Layer (Ω/inch$^2$) |
|---|---|---|---|---|---|---|---|---|
| 8* | 7.5 | 0.15 | 2.0 | 2.2 | Extremely small | 25 | 0 | 9.7 × 10$^9$ |
| 9 | 10 | 0.2 | 1.8 | 2.0 | Extremely small | 9 | 0 | 4.6 × 10$^8$ |
| 10 | 15 | 0.3 | 1.8 | 1.9 | Extremely small | 4 | 0 | 2.3 × 10$^7$ |
| 11 | 25 | 0.5 | 1.7 | 1.8 | Extremely small | 1 | 0 | 9.7 × 10$^7$ |
| 12 | 40 | 0.8 | 1.7 | 1.7 | Extremely small | 2 | 0 | 8.0 × 10$^7$ |
| 13 | 50 | 1 | 1.8 | 1.8 | Extremely small | 2 | 0 | 7.1 × 10$^7$ |
| 14 | 75 | 1.5 | 1.8 | 1.9 | Extremely small | 3 | 0 | 5.4 × 10$^7$ |
| 15 | 100 | 2 | 1.9 | 2.1 | small | 5 | 0 | 3.9 × 10$^7$ |
| 16 | 150 | 3 | 2.0 | 2.3 | small | 7 | 0 | 2.6 × 10$^7$ |
| 17* | 200 | 4 | 2.3 | 3.0 | great | 20 | 0 | 1.3 × 10$^7$ |

*Comparative Example

It can be seen from the results of Tables 1 and 2 that if the oxide of the present invention or a mixture of the oxide and the carbon black is added to the backing layer, a magnetic recording medium having a decreased coefficient of friction, free from formation of scratches, and having good running properties can be obtained without deteriorating its S/N characteristics. Moreover, it can be seen that in the magnetic recording medium, the formation or drop out, due to the formation of scratches or electrostatic charging, is reduced.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a non-magnetic support, a magnetic recording layer on one side of the support, and a backing layer on the opposite side of the support to the magnetic recording layer, wherein said backing layer comprises a binder and a powder dispersed in the binder, wherein the powder is a powdered oxide represented by the formula $M^1.M^2.O_{2+x}$, wherein $M^1$ is at least one element selected from the group consisting of Ba, Sr, Pb and Ca; $M^2$ is at least one element selected from the group consisting of Ti, Zr and Sn; and x is in the range of from 0 to 0.9, or a mixture of said powdered oxide and carbon black, wherein the ratio of the total amount of the powder in the backing layer to the total amount of the binder in the backing layer is in the range of from 0.3:1 to 2:1 by weight, the mixing ratio of the powdered oxide to the carbon black is 1:9 or more by weight and wherein the powdered oxide has an average particle diameter of 0.5 μm or less.

2. The magnetic recording medium as claimed in claim 1, wherein the powdered oxide is represented by the formula $M^1.M^2.O_{2+x}$ wherein x is in the range of from 0 to 0.7.

3. The magnetic recording medium as claimed in claim 2, wherein the powdered oxide is represented by the formula $M^1.M^2.O_{2+x}$ wherein x is in the range of from 0 to 0.5.

4. The magnetic recording medium as claimed in claim 1, wherein the powdered oxide has an average particle diameter of from 0.03 to 0.3 μm.

5. The magnetic recording medium as claimed in claim 1, wherein the powdered oxide comprises powdered oxides having the different average particle diameters from each other.

6. The magnetic recording medium as claimed in claim 5, wherein the powdered oxide comprises a powdered oxide having an average particle diameter of from 0.03 to 0.09 μm and a powdered oxide having an average particle diameter of from 0.1 to 0.3 μm.

7. The magnetic recording medium as claimed in claim 6, wherein the mixing ratio of the powdered oxide to the carbon black is 3:7 or more by weight.

8. The magnetic recording medium as claimed in claim 7, wherein the mixing ratio of the powdered oxide to the carbon black is 5:5 or more by weight.

9. The magnetic recording medium as claimed in claim 1, wherein the carbon black has an average particle diameter of from 5 to 250 mμ.

10. The magnetic recording medium as claimed in claim 9, wherein the carbon black has an average particle diameter of from 10 to 150 mμ.

11. The magnetic recording medium as claimed in claim 1, wherein the binder used in the backing layer is selected from the group consisting of thermoplastic resins, thermosetting resins, reactive type resins and mixtures thereof.

12. The magnetic recording medium as claimed in claim 11, wherein the binder used in the backing layer has a glass transition temperature of 40° C. or more.

13. The magnetic recording medium as claimed in claim 12, wherein the binder used in the backing layer has a glass transition temperature of 60° C. or more.

14. The magnetic recording medium as claimed in claim 1, wherein the ratio of the total amount of the powder in the backing layer to the total amount of the binder in the backing layer is in the range of from 0.5:1 to 1.5:1 by weight.

15. The magnetic recording medium as claimed in claim 1, wherein the thickness of the backing layer is in the range of from 0.2 to 2.0 μm.

16. The magnetic recording medium as claimed in claim 15, wherein the thickness of the backing layer is in the range of from 0.3 to 1.5 μm.

17. The magnetic recording medium as claimed in claim 1, wherein said powdered oxide is the only powder dispersed in the binder.

* * * * *